(12) United States Patent
Bajaj et al.

(10) Patent No.: US 10,437,392 B2
(45) Date of Patent: Oct. 8, 2019

(54) APPARATUS AND METHOD FOR DETECTING HARD AND SOFT TOUCH BY USING ACOUSTIC SENSORS

(75) Inventors: Nitin Bajaj, San Jose, CA (US); Madan Ankapura, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 13/542,197

(22) Filed: Jul. 5, 2012

(65) Prior Publication Data

US 2014/0009401 A1   Jan. 9, 2014

(51) Int. Cl.
   *G06F 3/041*   (2006.01)
   *G06F 3/043*   (2006.01)
   *G06F 3/0488*  (2013.01)

(52) U.S. Cl.
   CPC ............ *G06F 3/043* (2013.01); *G06F 3/0416* (2013.01); *G06F 3/0488* (2013.01); *G06F 2203/04106* (2013.01)

(58) Field of Classification Search
   CPC ........ G06F 3/041; G06F 3/043; G06F 3/0488; G06F 3/0416; G06F 2203/04106
   USPC ........................................................ 345/173
   See application file for complete search history.

(56) References Cited

U.S. PATENT DOCUMENTS

| 7,088,347 | B2 | 8/2006 | Iisaka et al. |
| 2006/0197753 | A1 | 9/2006 | Hotelling |
| 2006/0263068 | A1 | 11/2006 | Jung |
| 2007/0057922 | A1* | 3/2007 | Schultz ............... G06F 3/03547 345/173 |
| 2008/0088602 | A1 | 4/2008 | Hotelling |
| 2009/0205041 | A1* | 8/2009 | Michalske ...................... 726/17 |
| 2010/0162182 | A1 | 6/2010 | Oh et al. |
| 2010/0225340 | A1* | 9/2010 | Smith ..................... G06F 3/011 324/713 |
| 2010/0279738 | A1 | 11/2010 | Kim et al. |
| 2010/0321289 | A1* | 12/2010 | Kim et al. .................... 345/156 |
| 2011/0018825 | A1* | 1/2011 | Kondo et al. ................. 345/173 |
| 2011/0037734 | A1* | 2/2011 | Pance et al. .................. 345/177 |
| 2011/0084914 | A1* | 4/2011 | Zalewski ...................... 345/173 |
| 2011/0134061 | A1 | 6/2011 | Lim |
| 2011/0167391 | A1 | 7/2011 | Momeyer et al. |

FOREIGN PATENT DOCUMENTS

| JP | 8-137611 A | 5/1996 |
| JP | H11-203045 A | 7/1999 |
| JP | 2006323690 A | 11/2006 |
| JP | 3988476 B2 | 10/2007 |
| JP | 2011-25576 A | 2/2011 |

(Continued)

OTHER PUBLICATIONS

European Decision to refuse dated Dec. 4, 2018, issued in European Patent Application No. 13 172 205.0.

(Continued)

*Primary Examiner* — Andrew Sasinowski
(74) *Attorney, Agent, or Firm* — Jefferson IP Law, LLP

(57) ABSTRACT

An apparatus and a method for detecting a touch input to a touchscreen and distinguishing between different types of touch inputs are provided. The method includes detecting the input to a touch screen of the terminal, and determining an input type that is input to the touch screen based on characteristics of the input.

21 Claims, 3 Drawing Sheets

(56) References Cited

FOREIGN PATENT DOCUMENTS

| JP | 2011028555 A | 2/2011 |
| JP | 2011-97381 A | 5/2011 |
| JP | 2011123888 A | 6/2011 |
| JP | 2013508808 A | 3/2013 |
| JP | 2013067599 A | 4/2013 |
| JP | 2013-516703 A | 5/2013 |
| WO | 2012/078079 A1 | 6/2012 |

OTHER PUBLICATIONS

Harrison et al.; TapSense: Enhancing Finger Interaction on Touch Surfaces; Paper Session: Pointing; UIST'11; Oct. 16-19, 2011; Santa Barbara, CA.
Japanese Office Action dated Aug. 31, 2018; Japanese Appln. No. 2013-134635.
European Preliminary Opinion dated Oct. 30, 2018; European Appln. No. 13172205.0.
European Office Action dated Jun. 14, 2019; Reference # P6046018EP1; Application/Patent #: 19155090.4-1221.

* cited by examiner

APPARATUS AND METHOD FOR DETECTING HARD AND SOFT TOUCH BY USING ACOUSTIC SENSORS

BACKGROUND OF THE INVENTION

1. Field of the Invention

The present invention relates to an apparatus and a method for detecting an input to a terminal. More particularly, the present invention relates to an apparatus and a method for detecting a touch input to a touchscreen and distinguishing between different types of touch inputs.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

A mobile terminal according to the related art includes an input means that enables a user to input an input to the mobile terminal by a touch or a motion. For example, the mobile terminal may have a display unit configured with a touch screen through which the user may input the input to the mobile terminal.

According to the related art, there are a variety of touch screen technologies that have different methods of sensing a user's touch. For example, touch screen sensing technologies includes a resistive sensing technology, a capacitive sensing technology, a surface acoustic wave sensing technology, an infrared sensing technology, optical imaging sensing technology, and an acoustic pulse recognition sensing technology.

A touch screen according to the related art includes a plurality of sensors formed in layers making up the touch screen or formed around the periphery of the touch screen. The sensors are configured to create and monitor a grid on the touchscreen according to x and y coordinates. For example, when a user touches the touchscreen, the sensors are configured to determine the x and y coordinates of the touch. The x and y coordinates may be used by the mobile terminal to determine the input desired by the user.

For example, a mobile terminal according to the related art using a touch screen including acoustic pulse recognition sensing technology has a plurality of acoustic sensors or transducers positioned around the edge of the touch screen. The acoustic sensors detect when a user touches the touch screen based on the sound created when the user touches the screen. Based on the detected sound created when a user touches the touch screen, the mobile terminal determines where the user touched the screen by triangulating the location at which the sound originated (e.g., the location at which the user made contact with the touch screen). Alternatively, the mobile terminal may compare the inputs from the plurality of sensors to a predefined table (e.g., a Look Up Table (LUT)) storing characteristics of sounds created at each location on a touch screen.

According to the related art, detection of a user's touch on the touch screen is used for a corresponding function associated with a location on the touch screen at which the user's touch is detected. In other words, a mobile terminal according to the related art does not distinguish between the type of touch on the touch screen. Rather, a mobile terminal according to the related art merely registers the location at which a touch occurs.

Accordingly, there is a need for an apparatus and a method for detecting a touch input to a touchscreen and for determining the type of touch input to the touch screen and/or for distinguishing between different types of touch inputs.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for detecting a touch input to a touchscreen and for determining the type of touch input to the touch screen and/or for distinguishing between different types of touch inputs.

In accordance with an aspect of the present invention, a method for detecting an input to a terminal is provided. The method includes detecting the input to a touch screen of the terminal, and determining an input type that is input to the touch screen based on characteristics of the input.

In accordance with another aspect of the present invention, an apparatus for detecting an input to a terminal is provided. The apparatus includes a touch screen comprising a plurality of first sensors, a plurality of second sensors, and a controller for determining, based on data corresponding to characteristics of the input received from the plurality of second sensors, an input type that is input to the touch screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
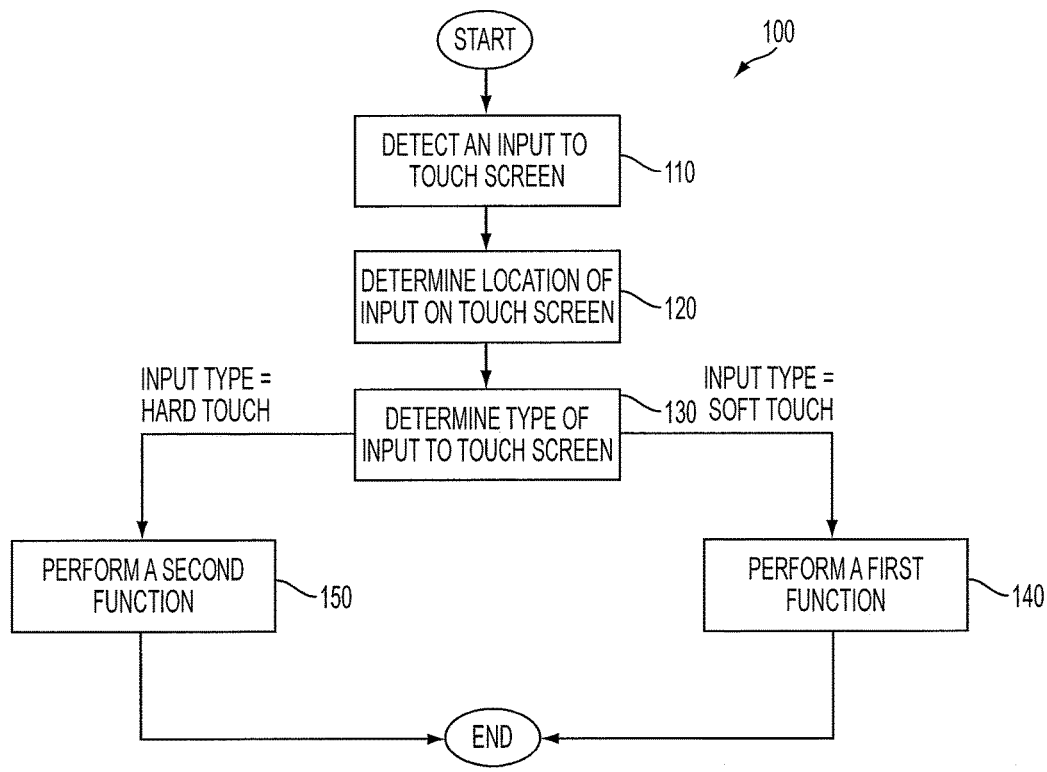
FIG. 1 is a flowchart illustrating a method for detecting an input to a terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and a method for detecting a touch input to a touchscreen and for determining an input type of an input to the touch screen and/or for distinguishing between different types of touch inputs.

Exemplary embodiments of the present invention couple location coordinate data associated with a touch to a touch screen with data associated with the input type of an input (e.g., touch event) to enhance functionality of the touch screen. Productivity of the user may be increased because of the corresponding enhancement in functionality. According to exemplary embodiments of the present invention, the terminal is configured to detect input types (e.g., touch events) at the same location coordinates (i.e., the terminal may detect the type of input and the respective location coordinates of the input) and associate a different action (e.g., function) based on the input types of an input (e.g., touch event). In other words, the terminal may associate different actions for different types of inputs occurring at the same location coordinates.

According to exemplary embodiments of the present invention, the terminal may determine input type of an input (e.g., touch event) or distinguish between input types based on a sound generated by the input (e.g., touch event). For example, knowingly or unknowingly, users interface with a touch screen so as to generate inputs (e.g., touch events) in at least two ways—a soft touch and a hard touch. As an example, a user may generate a soft touch by making contact with the touch screen using skin at the bottom of the user's finger. When the user generates a soft touch by making contact with the touch screen using, for example, skin at the bottom of the user's finger, a feeble sound is generated based on contact with the touch screen. As another example, a user may generate a hard touch by making contact with the touch screen using the nail or bone (e.g., knuckle). When the user generates a hard touch making contact with the touch screen using, for example, the nail or bone, a knocking sound is generated based on contact with the touch screen. A user may also generate a hard touch by making contact with the touch screen using the base of the user's finger. According to exemplary embodiments of the present invention, if the user is cognizant as to how the user interacts with the touch screen, then additional functionality may be used based on such an interaction. For example, the difference between the sounds generated based on the type of touch may be used to distinguish between a desired function. If the user makes contact so as to generate a feeble sound the contact may be associated with a predefined function. Conversely, if the user makes contact so as to generate a knocking sound, the contact may be associated with another predefined function.

According to exemplary embodiments of the present invention, the terminal may comprise a plurality of acoustic sensors that may be coupled with a touch screen to detect the characteristics of the input (e.g., touch event) on the touch screen. For example, based on the sound characteristics of the input (e.g., touch event), the type of touch may be detected. The sound characteristics may include frequency, amplitude, and/or the like.

FIG. 1 is a flowchart illustrating a method for detecting an input to a terminal according to an exemplary embodiment of the present invention.

Referring to FIG. 1, the terminal detects an input to a touch screen at step 110. For example, the touch screen may be configured with a plurality of sensors that detect when an input (e.g., a touch event) occurs on a touch screen. The plurality of sensors may include sensors using at least one of a resistive sensing technology, a capacitive sensing technology, a surface acoustic wave sensing technology, an infrared sensing technology, optical imaging sensing technology, an acoustic pulse recognition sensing technology, and the like.

At step 120, the terminal determines a location of the input (e.g., the touch event) on the touch screen. For example, the location of the input on the touch screen may be determined as corresponding (x, y) location coordinates. According to exemplary embodiments of the present invention, the plurality of sensors of the touch screen may include a plurality of first sensors and a plurality of second sensors. As an example, the plurality of first sensors may be configured to detect the location of the input on the touch screen. The plurality of sensors may transmit data associated with the input (e.g., the touch event) to a controller which determines the location of the input on the touch screen.

At step 130, the terminal determines the input type of the input to the touch screen. For example, the input type of the input to the touch screen may be determined based on the characteristics of the input. Characteristics of the input may include the sound characteristics of the input. For example, the sound characteristics may be the frequency, amplitude, and the like. Based on the characteristics of the input, the terminal may determine whether the input (e.g., the touch event) is a soft touch or a hard touch. For example, the terminal may distinguish between input types. According to exemplary embodiments of the present invention, the terminal may determine whether the input is a soft touch or a hard touch based on data received form the plurality of sensors. For example, the controller may determine whether the input is a soft touch or a hard touch based on data received from the plurality of second sensors.

According to exemplary embodiments of the present invention, if the controller determines that the input is a soft touch, then at step 140 the terminal performs a first function associated with a soft touch input at the location coordinates corresponding to the location at which the input occurred on the touch screen. In other words, the terminal performs a first function associated with the characteristics of the input (e.g., touch event). The characteristics of the input may be represented as (x, y, soft touch input type).

According to exemplary embodiments of the present invention, if the controller determines that the input is a hard touch, then at step 150 the terminal performs a second function associated with a hard touch input at the location coordinates corresponding to the location at which the input occurred on the touch screen. In other words, the terminal performs a second function associated with the characteristics of the input (e.g., touch event). The characteristics of the input may be represented as (x, y, hard touch input type).

Figure 2:
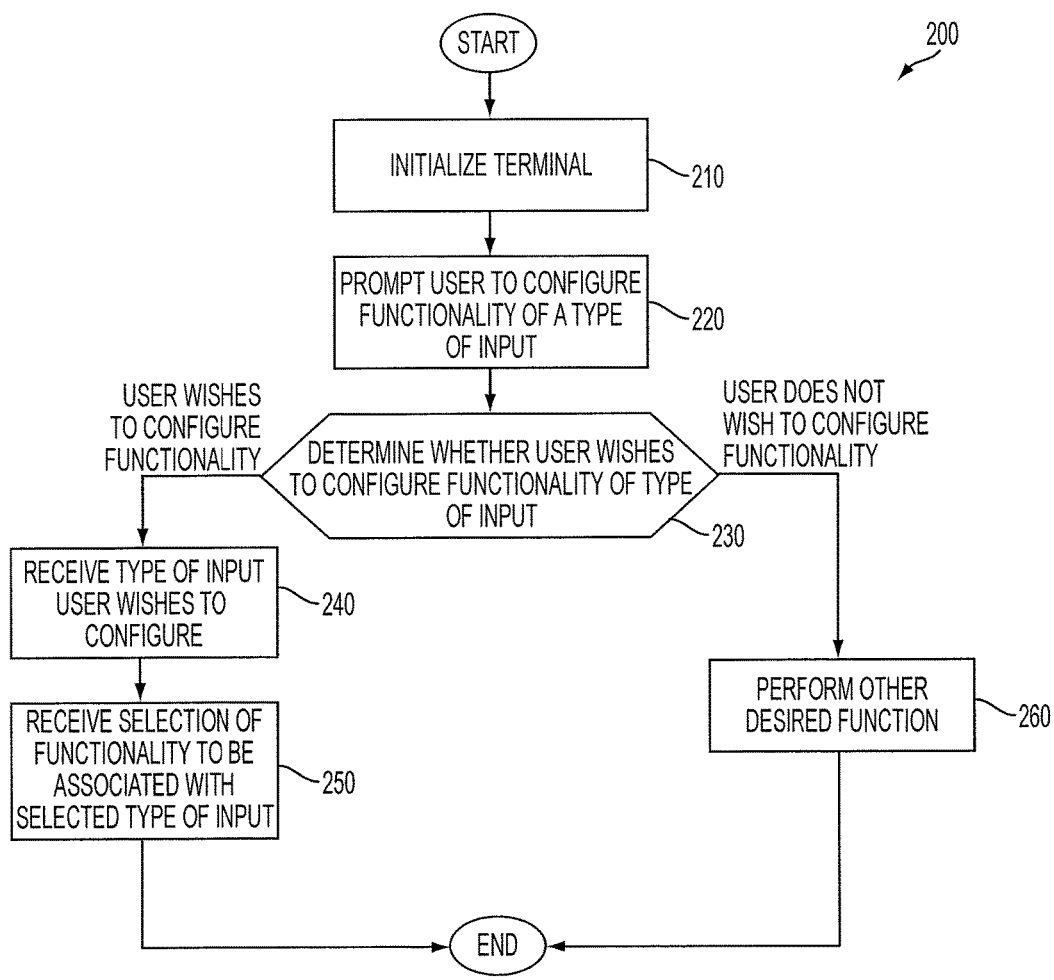
FIG. 2 is a flowchart illustrating a method for configuring a terminal to detect an input to a terminal according to an exemplary embodiment of the present invention.

FIG. 2 is a flowchart illustrating a method for configuring a terminal to detect an input to a terminal according to an exemplary embodiment of the present invention.

Referring to FIG. 2, a user may configure a functionality (e.g., the first function and the second function) associated with each corresponding input type to the touch screen.

At step 210, the terminal is initialized. After the terminal is initialized, at step 220, the terminal may prompt a user to configure the functionality associated with a corresponding input type to the touch screen. For example, the terminal may prompt the user for such a configuration according to a user's selection to configure the functionality of an input type.

At step 230, the terminal determines whether the user wants to configure the functionality of an input type. If the terminal determines that the user wants to configure the functionality of an input type, then at step 240 the terminal receives (e.g., detects) the input type which the user wants to configure. For example, the terminal may prompt the user to select which input type the user wants to configure. The terminal may prompt the user to select or identify the context in which the configuration is to be applied. For example, the user may select to configure the functionality for an input type for the context in which the terminal is in a locked state. As another example, the user may select may select to configure the functionality for an input type for the context in which the terminal is in an unlocked state. As a further example, the user may select to configure the functionality for an input type for the context in which the terminal is operating a specific application or type of application. At step 250, the terminal receives a selection of the functionality to be associated with the selected input type.

According to exemplary embodiments of the present invention, the terminal may be configured to, based on a input of a specific input type to the touch screen, unlock or initialize the unlocking of the terminal when the terminal is in a locked state. The terminal may also be configured to lock a terminal based on an input of a specific input type to the touch screen when the terminal is in a locked state.

According to exemplary embodiments of the present invention, the terminal may be configured to perform advanced functions when a specific input type (e.g., a hard touch) is input to the touch screen. For example, the terminal may be configured to display a menu when a hard touch is detected. As another example, the terminal may be configured to perform a function such as a cut operation, a copy operation, a paste operation, and the like when a hard touch is detected. The terminal may be configured to launch an application when a hard touch is detected.

If at step 230 the terminal determines that the user does not want to configure the functionality of an input type, then the terminal performs another function according to user input, at step 260.

Figure 3:
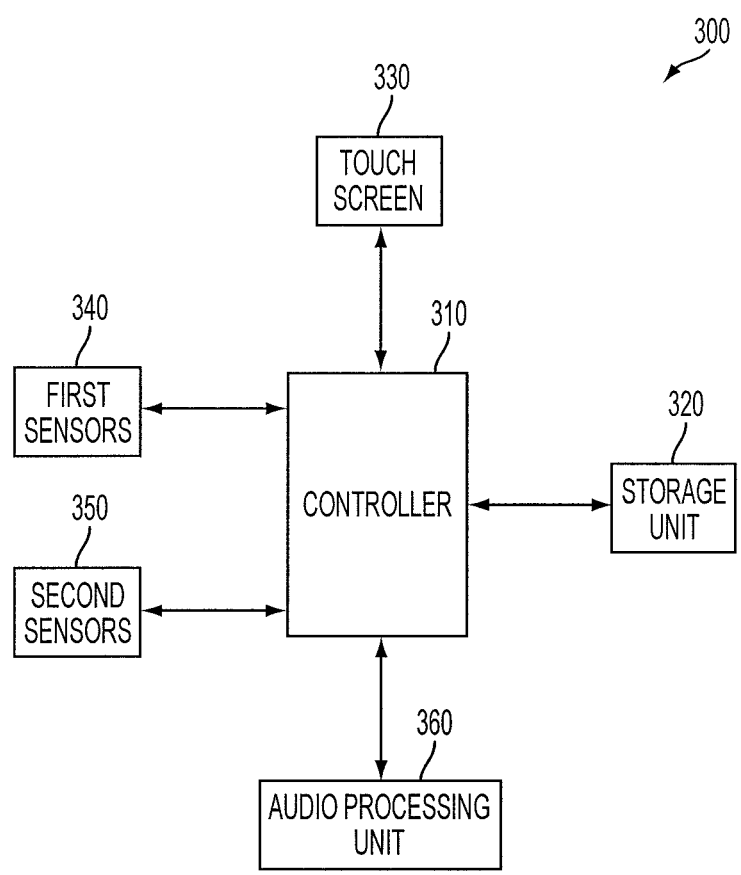
FIG. 3 illustrates a block diagram schematically illustrating a configuration of a mobile terminal according to exemplary embodiments of the present invention.

FIG. 3 illustrates a block diagram schematically illustrating a configuration of a mobile terminal according to exemplary embodiments of the present invention.

Referring to FIG. 3, a mobile terminal 300 includes a controller 310, a storage unit 320, a touch screen 330, a plurality of first sensors 340, a plurality of second sensors 350, and an audio-processing unit 360. As an example, the mobile terminal 300 having such a configuration may load a specific functionality or application upon input of a specific input type to the touch screen 330.

According to exemplary embodiments of the present invention, the mobile terminal 300 may be configured to define (e.g., associated and/or store) a functionality associated with an input type that is input to the mobile terminal 300. The mobile terminal may be configured to define a functionality associated with an input type and a context in which a specific input type is input to the mobile terminal 300. The mobile terminal 300 may be so configured based on interaction between a user and the mobile terminal 300 via the touch screen 330. The mobile terminal 300 may be configured such that when a specific input type (e.g., a hard touch event or a soft touch event) is input via the touch screen 330, the mobile terminal 300 automatically loads a previously defined functionality or application associated with the specific input type that is input to the mobile terminal 300. Hereinafter, each component of the mobile terminal 300 will be explained in detail.

The audio processing unit 360 may be formed as an acoustic component. The audio processing unit 360 transmits and receives audio signals, and encodes and decodes the audio signals. For example, the audio processing unit 360 may include a CODEC and an audio amplifier. The audio processing unit 360 is connected to a Microphone (MIC) and a Speaker (SPK). The audio processing unit 360 converts analog voice signals inputted from the Microphone (MIC) into digital voice signals, generates corresponding data for the digital voice signals, and transmits the data to the controller 310. Further, the audio processing unit 360 converts digital voice signals inputted from the controller 310 into analog voice signals, and outputs the analog voice signals through the Speaker (SPK). Further, the audio processing unit 360 may output various audio signals generated in the mobile terminal 300 through the Speaker (SPK). For example, the audio processing unit 360 can output audio signals according to an audio file (e.g. MP3 file) replay, a moving picture file replay, and the like through the speaker.

The touch screen 330 may operatively display input keys and function keys for receiving user input. For example, the touch screen 330 may include input keys and function keys for receiving an input of numbers or various sets of letter information, setting various functions, and controlling functions of the mobile terminal 300. For example, the touch screen 330 may include a calling key for requesting a voice call, a video call request key for requesting a video call, a termination key for requesting termination of a voice call or a video call, a volume key for adjusting output volume of an audio signal, a direction key, and the like. In particular, the touch screen 330 according to exemplary embodiments of the present invention may transmit to the controller 310 signals related to characteristics of the input such as, for example, the location and type of input that is input via the touch screen 330.

The touch screen 330 also displays information inputted by user or information to be provided to user as well as various menus of the mobile terminal 300. For example, the touch screen 330 may provide various screens according to a user of the mobile terminal 300, such as an idle screen, a message writing screen, a calling screen, and the like. As an example, the touch screen 330 can output an interface with which a user may interface to configure the functionality of a specified input type and/or the functionality of a an input based on the context in which the input is input to the mobile terminal 300. The touch screen 330 can be formed as a Liquid Crystal Display (LCD), an Organic Light Emitting Diode (OLED), an Active Matrix Organic Light Emitting Diode (AMOLED), and the like. However, exemplary embodiments of the present invention are not limited to these examples.

The storage unit 320 can store user data, and the like, as well a program which performs operating functions according to an exemplary embodiment of the present invention. For example, the storage unit 320 may store a program for controlling general operation of a mobile terminal 300, an Operating System (OS) which boots the mobile terminal 300, and application program for performing other optional functions such as a camera function, a sound replay function, an image or video replay function, a Near Field Communication (NFC) function, and the like. Further, the storage unit 320 may store user data generated according to a user of the mobile terminal, such as, for example, a text message, a game file, a music file, a movie file, and the like. In particular, the storage unit 320 according to exemplary embodiments of the present invention may store a table which stores a mapping of inputs and input types with a functionality or application to be loaded upon transition of the mobile terminal 300 to the unlocked state. For example, the storage unit 320 may store associations between at least one input and a predefined functionality or application to be automatically loaded upon input of the at least one input to the mobile terminal 300. As an example, the storage unit 320 may store association between an input and a predefined functionality such that the input is characterized by location coordinates and input type. The input may be characterized by variables such as (x, y, input type).

According to exemplary embodiments of the present invention, the mobile terminal 300 comprises a plurality of sensors. The plurality of sensors may comprise a plurality of first sensors 340 and a plurality of second sensors 350. The plurality of first sensors detect an input to the touch screen 330. For example, the plurality of sensors may detect characteristics of the input to the touch screen 330. The plurality of first sensors 340 may detect a location of the input and the plurality of second sensors 350 may detect an input type of the input. According to exemplary embodiments of the present invention, the plurality of second sensors 350 may detect a sound generated by the input, a vibration generated by the input, the pressure of the input, and the like. For example, the plurality of second sensors 350 may be a plurality of acoustic sensors, a plurality of pressure sensors, and the like. The plurality of second sensors 350 may be positioned on the outside of the mobile terminal 300. As another example, the plurality of second sensors 350 may be positioned on the bezel of the phone.

According to exemplary embodiments of the present invention, the mobile terminal 300 comprises at least one controller 310. The at least one controller 310 may control general operation of the mobile terminal 300. For example, the controller 310 may control operation of the various components or units included in the mobile terminal 300. The controller 310 may transmit a signal to the various components included in the mobile terminal 300 and control a signal flow between internal blocks of the mobile terminal 300. In particular, the controller 310 according to exemplary embodiments of the present invention can control to load (e.g., launch), upon detection of an input, a predefined functionality or application associated with the input (e.g., including location and input type) entered via the touch screen 330. To this end, the controller 310 may determine, based on data or input received from the plurality of first sensors 340 and the plurality of second sensors 350, the location (e.g., the x and y location coordinates) and the input type of an input and load the associated functionality or application upon detection of the input based on the associations or mappings stored in the storage unit 320.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lap-top PC, a tablet, a global positioning system (GPS) navigation, and devices such as a desktop PC, a high definition television (HDTV), an optical disc player, a set top box, and the like capable of wireless communication or network communication consistent with that disclosed herein.

A method for detecting an input to a terminal according to exemplary embodiments of the present invention may be implemented in an executable program command form by various computer means and be recorded in a non-transitory computer readable recording medium. The computer readable recording medium may include a program command, a data file, and a data structure individually or a combination thereof. The program command recorded in a recording medium may be specially designed or configured for exemplary embodiments of the present invention, or may be known to a person having ordinary skill in a computer software field.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, a hardware device such as ROM, RAM, flash memory storing and executing program commands, and the like. Further, the program command includes a machine language code created by a compiler and a high-level language code executable by a computer using an interpreter. The foregoing hardware device may be configured to be operated as at least one software module to perform an operation of exemplary embodiments of the present invention.

As explained above, exemplary embodiments of the present invention couple location coordinate data associated with a touch to a touch screen with data associated with the type of input (e.g., touch event) to enhance functionality of the touch screen. In other words, exemplary embodiments of the present invention may determine or distinguish between a hard touch input and a soft touch input. According to exemplary embodiments of the present invention, the terminal may associate different actions or functionality with different input types. According to exemplary embodiments of the present invention, the terminal may use the location coordinates and the input to determine which functionality to load.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for detecting an input to a device comprising:
providing a prompt to select a user configurable input type;
receiving a user input, which defines a function with the input type, a first function being defined with a soft touch input type and a second function being defined with a hard touch input type;
detecting an input to a touch screen of the device via a plurality of acoustic sensors;
determining the type of the input based on an acoustic characteristic of the input detected via the plurality of acoustic sensors; and
performing the defined function based on the type of the input,
wherein the characteristic of the input distinguishes between a touch input from a fingertip and a knuckle.

2. The method of claim 1, wherein defining the function with the input type is user configurable.

3. The method of claim 1, wherein defining the function with the input type includes a context of the input.

4. The method of claim 1, wherein the input type is determined based on physical characteristics of the input.

5. The method of claim 1, wherein the detecting of the input to the touch screen includes determining a location on the touch screen at which the input occurred.

6. The method of claim 5, wherein the first function corresponds to a function associated with the location at which the input occurred.

7. The method of claim 1, wherein the determining of whether the input is the hard touch or the soft touch includes detecting a sound generated by the input to the touch screen.

8. The method of claim 7,
wherein a plurality of acoustic sensors positioned around the touch screen detect the sound generated by the input, and
wherein a controller determines whether the input is the hard touch or the soft touch.

9. The method of claim 1, wherein the second function corresponds to a function associated with an advanced function.

10. The method of claim 9, wherein the advanced function includes at least one of initiating unlocking of the device, or initiating display of a menu.

11. A device comprising:
a touch screen;
a plurality of acoustic sensors; and
a controller configured to:
provide a prompt to select a user configurable input type,
receive a user input, which defines a function with the input type, a first function being defined with a soft touch input type and a second function being defined with a hard touch input type,
detect an input to a touch screen of the device via the plurality of acoustic sensors,
determine the type of the input based on an acoustic characteristic of the input detected via the plurality of acoustic sensors, and
perform the defined function based on the type of the input,
wherein the characteristic of the input distinguishes between a touch input from a fingertip and a knuckle.

12. The device of claim 11, wherein the defining of the function with the input type is user configurable.

13. The device of claim 11, wherein the defining of the function with the input type includes a context of the input.

14. The device of claim 11, wherein the controller is further configured to determine the input type based on physical characteristics of the input detected by the audio sensor.

15. The device of claim 14, wherein the controller is further configured to determine whether the input is the hard touch or the soft touch according to sound generated by the input to the touch screen.

16. The device of claim 15, wherein the audio sensor comprises a plurality of audio sensors positioned around the touch screen and are configured to detect the sound generated by the input.

17. The device of claim 11, wherein the controller is further configured to determine, based on data received from the touch screen, a location on the touch screen at which an input occurred.

18. The device of claim 17, wherein the first function corresponds to a function associated with a location at which the input occurred.

19. The device of claim 11, wherein the second function corresponds to a function associated with an advanced function.

20. The device of claim 19, wherein the advanced function includes at least one of initiating unlocking of the device, or initiating display of a menu.

21. A non-transitory computer readable storage medium, including instructions executable by a processor, the instructions comprising:
providing a prompt to select a user configurable input type;
receiving a user input, which defines a function with the input type, a first function being defined with a soft touch input type and a second function being defined with a hard touch input type;
detecting an input to a touch screen of the device via a plurality of acoustic sensors;
determining the type of the input based on an acoustic characteristic of the input detected via the plurality of acoustic sensors; and
performing the defined function based on the type of the input,
wherein the characteristic of the input distinguishes between a touch input from a fingertip and a knuckle.

* * * * *